(12) United States Patent
Nagy et al.

(10) Patent No.: US 11,760,956 B2
(45) Date of Patent: *Sep. 19, 2023

(54) PREVENTION OF MCPDE FORMATION IN TRIACYLGLYCERIDE OILS

(71) Applicant: SOCIETE DES PRODUITS NESTLE S.A., Vevey (CH)

(72) Inventors: Kornel Nagy, La Tour-de-Peilz (CH); Marine Nicolas, Morges (CH); Karine Meisser Redeuil, Pully (CH); Xanthippi Theurillat, Cheseaux-sur-Lausanne (CH); Sabine Lahrichi, Montreux (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/415,458

(22) PCT Filed: Apr. 30, 2019

(86) PCT No.: PCT/EP2019/061097
§ 371 (c)(1),
(2) Date: Jun. 17, 2021

(87) PCT Pub. No.: WO2020/126117
PCT Pub. Date: Jun. 25, 2020

(65) Prior Publication Data
US 2022/0041954 A1    Feb. 10, 2022

(30) Foreign Application Priority Data

Dec. 19, 2018   (EP) .................................. 18214128
Mar. 13, 2019   (WO) ...................... PCT/EP19/56309

(51) Int. Cl.
*C11B 3/16*    (2006.01)
*B01D 21/26*   (2006.01)
(Continued)

(52) U.S. Cl.
CPC .............. *C11B 3/16* (2013.01); *B01D 21/262* (2013.01); *C11B 3/001* (2013.01); *C11B 3/006* (2013.01); *C11B 7/0075* (2013.01); *B01D 21/02* (2013.01)

(58) Field of Classification Search
CPC ........... C11B 3/001; C11B 3/16; C11B 3/006; B01D 21/02; B01D 21/262
See application file for complete search history.

(56) References Cited

U.S. PATENT DOCUMENTS 2,223,077 A    11/1940 Stadt
2014/0018559 A1*  1/2014 Nagy ..................... C11B 3/14
                                              554/21
(Continued)

FOREIGN PATENT DOCUMENTS

EP    2594625   *  5/2013   ............... C11B 3/00
EP    2716746       4/2014
(Continued)

*Primary Examiner* — Yate' K Cutliff
(74) *Attorney, Agent, or Firm* — K&L Gates LLP

(57) ABSTRACT

A method is provided for preventing or reducing the formation of monochloropropanediols (MCPDs) or monochloropropanediol esters (MCPDEs) in triacylglyceride oil, comprising the steps: (a) concentrating insoluble components in liquid triacylglyceride oil by (i) applying a 5 centrifugational force on the triacylglyceride oil whilst maintaining the triacylglyceride oil above its melting temperature; and/or (ii) allowing the insoluble components to settle by gravitational force whilst maintaining the triacylglyceride oil above its melting temperature; (b) separating the triacylglyceride oil from the insoluble components; (c) optionally applying additional refining steps and (d) applying heat treatment to
(Continued)

the triacylglyceride oil. A purified 10 triacylglyceride oil obtainable by the method of the invention is also provided.

14 Claims, 14 Drawing Sheets

(51) Int. Cl.
*C11B 7/00* (2006.01)
*C11B 3/00* (2006.01)
*B01D 21/02* (2006.01)

(56) References Cited

U.S. PATENT DOCUMENTS

| 2017/0042174 A1* | 2/2017 | Brüse | A23L 33/115 |
| 2021/0002582 A1* | 1/2021 | Nagy | C11B 3/10 |

FOREIGN PATENT DOCUMENTS

| EP | 2716746 A1 * | 4/2014 | ............... A23D 9/02 |
| EP | 3098292 | 11/2016 | |
| EP | 3098292 A1 * | 11/2016 | ............. C11B 3/001 |
| WO | WO-2012107230 A1 * | 8/2012 | ............... A23D 9/04 |
| WO | 2013163112 | 10/2013 | |
| WO | 2014081279 | 5/2014 | |
| WO | WO-2017035403 * | 3/2017 | ............... C11B 3/10 |

\* cited by examiner

PREVENTION OF MCPDE FORMATION IN TRIACYLGLYCERIDE OILS

CROSS REFERENCE TO RELATED APPLICATIONS

The present application is a National Stage of International Application No. PCT/EP2019/061097, filed on Apr. 30, 2019, which claims priority to European Patent Application No. 18214128.3, filed on Dec. 19, 2018, and International Application No. PCT/EP19/056309, filed on Mar. 13, 2019, the entire contents of which are being incorporated herein by reference.

FIELD OF THE INVENTION

The present invention relates to the purification of oils. In particular, the invention relates to the mechanical purification of triacylglyceride oil to reduce or completely remove monochloropropandiol esters (MCPDEs) from refined oil.

BACKGROUND TO THE INVENTION

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47).

3-MCPD was originally found in acid-hydrolysed vegetable protein (acid-HVP; Z. Lebensm.-Unters. Forsch. (1978) 167: 241-244). More recently, it was found that refined edible oils may contain 3-MCPD in its fatty acid ester form, but only very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It has been reported that chlorination of acylglycerides can occur at very high temperatures, for example during the final step of the oil refining process, or deodorization, under which oils may be heated under vacuum (3-7 mbar) up to 260-270° C. This may result in the formation of fatty acid esters of MCPD.

Effective mitigation routes for MCPD esters are limited and pose a challenge to the plant oil refining industry. Currently, the presence of 3-MCPD in refined oils is carefully monitored and oils with 3-MCPD content above a threshold value are discarded in order to ensure full compliance with EFSA recommendations.

As 3-MCPD may occur in many refined commercially important oils, such as plant oils, there exists a significant need for improved methods for removing and/or avoiding the production of such contaminants during oil refining.

SUMMARY OF THE INVENTION

The inventors have invented a method by which MCPDs and MCPD esters (MCPDE including monoesters and diesters) formation during the process of oil refining can be substantially reduced or prevented.

The principle of the method is to deploy a gravitational and/or centrifugal force based mechanical step that allows the physical separation of insoluble, chlorine or chloride containing substances from the oil subject to purification. As a result, the insoluble, chlorine or chloride containing substances, which potentially serve as a chlorine source, are enriched in the sedimented fraction of the oil and can be thus separated from the oil to be refined. The method of the invention can be applied to crude or partially refined triacylglycerol (also called triacylglyceride) oil which include but are not limited to palm oil, palm stearin, palm olein and their various fractions, palm kernel oil, coconut oil, sunflower oil, high oleic sunflower oil and their variants, canola/rapeseed oil, soybean oil, fish oil, algae oil, cocoa butter and any mixtures/blends thereof.

The mechanical treatment can include centrifugation and/or settling either before, in between or after any other purification, refining or deodorization step.

Once removed, the potential sources of chlorine are no longer available for the formation of chlorinated compounds, such as MCPDs, MCPD mono-esters and MCPD di-esters during the heating steps in oil refinement. Product oils low in chlorine carrying substances are thereby obtained and the purified oils may be subjected to various refining practices, such as heat treatment and deodorization, in order to produce refined oils with reduced or no MCPDs and MCPDEs.

Further benefits of the method of the invention is that it enables lower temperatures to be used in deodorization of the oil, which both
1) reduces trans-fatty acid formation (trans fat formation at high temperature is reviewed in Baley's industrial oil and fat products; Sixth Edition; Volume 5 Edible Oil and Fat Products: Processing Technologies; Chapter 8 Deodorization; section 3. Refined oil quality, subsection 3.2 Fat isomerization and degradation products).
2) reduces formation of glycidyl esters (see the summary of the elimination methods of GEs in "Glycidyl fatty acid esters in refined edible oils: a review on formation, occurrence, analysis, and elimination methods" in Comprehensive Reviews in Food Science and Food-Safety; vol. 16, 263-281; 2017).

Accordingly, in one aspect the invention provides a method for preventing or reducing the formation of monochloropropanediols (MCPDs) or monochloropropanediol esters (MCPDEs) in triacylglyceride oil, comprising the steps:
(a) concentrating insoluble components in liquid triacylglyceride oil by
  1. applying a centrifugational force on the triacylglyceride oil whilst maintaining the triacylglyceride oil above its melting temperature; and/or
  2. allowing the insoluble components to settle by gravitational force whilst maintaining the triacylglyceride oil above its melting temperature;
(b) separating the triacylglyceride oil from the insoluble components;
(c) optionally applying one or more processes selected from physical refining, chemical refining, degumming, neutralization, interesterification, bleaching, dewaxing or fractionation in any combination.
(d) applying heat treatment to the triacylglyceride oil.

In some embodiments, the insoluble components comprise for example microparticles, segregated droplets, emulsions, suspensions and sediments.

In another embodiment, the heat treatment is deodorization (steam distillation or short path distillation).

In another embodiment, the heat treatment occurs in a closed vessel.

In one embodiment, the heat treatment applying step removes unwanted components. These can be color pigments, free fatty acids, monoglycerides, trace contaminants and/or odours.

In some embodiments, before step (a), the triacylglyceride oil is melted by heating it to above its melting temperature.

Accordingly, in one aspect the invention provides a method for preventing or reducing the formation of monochloropropanediols (MCPDs) or monochloropropanediol esters (MCPDEs) in triacylglyceride oil, comprising the steps:
- (e) melting the triacylglyceride oil by heating it to above its melting temperature;
- (f) concentrating insoluble components in liquid triacylglyceride oil by
  1. applying a centrifugational force on the triacylglyceride oil whilst maintaining the triacylglyceride oil above its melting temperature; and/or
  2. allowing the insoluble components to settle by gravitational force whilst maintaining the triacylglyceride oil above its melting temperature;
- (g) separating the triacylglyceride oil from the insoluble components
- (h) optionally applying one or more processes selected from physical refining, chemical refining, degumming, neutralization, interesterification, bleaching, dewaxing or fractionation in any combination.
- (i) applying heat treatment to the triacylglyceride oil.

In some embodiments, the insoluble components comprise for example microparticles, segregated droplets, emulsions, suspensions and sediments.

In one embodiment, the invention provides a method for preventing or reducing the formation of monochloropropanediols (MCPDs).

In one embodiment, the invention provides a method for preventing or reducing the formation of monochloropropanediol esters (MCPDEs).

In one embodiment, in step (a) or (f), a centrifugational force is applied on the triacylglyceride oil whilst maintaining the triacylglyceride oil above its melting temperature.

In one embodiment, in step (a) or (f), the insoluble components are allowed to settle by gravitational force whilst maintaining the triacylglyceride oil above its melting temperature.

In one embodiment, step (a 2) is performed and then step (a 1) is performed.

In one embodiment, step (a 1) is performed and then step (a 2) is performed.

In one embodiment, step (f 2) is performed and then step (f 1) is performed.

In one embodiment, step (f 1) is performed and then step (f 2) is performed.

In one embodiment, applying heat treatment comprises exposing the oil to temperatures in the 150-300° C. range, more commonly in the 160-290° C. or the 160-240° C. range preferably at least for 30 minutes.

In one embodiment, the triacylglyceride oil is palm oil and the heat treatment step comprises exposing the oil to temperatures in the range 160-290° C.

In one embodiment, the triacylglyceride oil is sunflower oil and the heat treatment step comprises exposing the oil to temperatures in the range 160-240° C.

In another embodiment, the heat treatment is deodorization (steam distillation or short path distillation).

In another embodiment, the heat treatment occurs in a closed vessel.

In one embodiment, the heat treatment applying step removes unwanted components. These can be color pigments, free fatty acids, monoglycerides, trace contaminants and/or odours.

In one embodiment, the quantity of the monochloropropanediols (MCPDs) or monochloropropandiol esters (MCPDEs) in the heat treated oil of step (d) or step (i) is measured.

In one embodiment, the quantity of the monochloropropanediols (MCPDs) or monochloropropandiol esters (MCPDEs) in the heat treated oil of step (d) or step (i) is measured by direct LC-MS.

In one embodiment the quantity of the MCPDEs in the heat treated oil of step (d) or step (i) is reduced by at least a factor of two as measured by direct LC-MS.

In one embodiment, the triacylglyceride oil of step (a) or step (e) is crude triacylglyceride oil.

In one embodiment, the triacylglyceride oil has not been degummed before step (a) or step (e). In one embodiment, the triacylglyceride oil has not been bleached before step (a) or step (e). In one embodiment, the triacylglyceride oil has not been fractionated before step (a) or step (e).

In a preferred embodiment, the triacylglyceride oil has not been deodorized before step (a) or step (e).

In one embodiment, the triacylglyceride oil is subjected to preliminary cleaning before step (a) or (e). In one embodiment, the triacylglyceride oil is subjected to preliminary refining before step (a) or step (e). In one embodiment, the triacylglyceride oil is subjected to fractionation before step (a) or step (e). In one embodiment, the triacylglyceride oil is subjected to hydrogenation before step (a) or step (e). In one embodiment, the triacylglyceride oil is subjected to interesterification before step (a) or step (e).

In one embodiment, the triacylglyceride oil is a plant oil, animal oil, fish oil or algal oil.

In a preferred embodiment, the triacylglyceride oil is a plant oil, preferably wherein the plant oil is selected from the group consisting of palm oil, sunflower oil, corn oil, canola oil, soybean oil, coconut oil, palm kernel oil and cocoa butter. In one embodiment, the triacylglyceride oil is palm oil. In one embodiment, the triacylglycerol oil is sunflower oil or its high oleic variants.

In one embodiment, the pH of the triacylglyceride oil is adjusted before step (a) or step (e). In one embodiment, the pH of the triacylglyceride oil is decreased by about 0.5-2.0, for example decreased by about 0.5, 1.0, 1.5 or 2.0. In another embodiment, the pH of the triacylglyceride oil is increased by about 0.5-2.0, for example increased by about 0.5, 1.0, 1.5 or 2.0.

In one embodiment, the pH of the triacylglyceride oil is adjusted by addition of citric acid or phosphoric acid. In another embodiment, the pH of the triacylglyceride oil is adjusted by addition of a bicarbonate salt or a hydroxide salt, such as sodium bicarbonate or sodium hydroxide.

In one embodiment, the triacylglyceride oil is pre-treated before step (a) or step (e), for example the triacylglyceride oil is admixed with acidified water before step (a) or step (e). Similar pH treatment steps are commonly practised in physical refining (see, for example, "Degumming of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 6. Degumming, Lecithin Processing, and Physical Refining Pretreatment). The solubilised acid content may be increased before step (a) or (e). In one embodiment, the triacylglyceride oil is admixed with water acidified by addition of citric acid or phosphoric acid. For example, 0.1-1 wt % acid solution containing 70-85% phosphoric acid can be used.

In another embodiment, the triacylglyceride oil is admixed with a base (such as caustic soda, NaOH) or its water solution. Similar pH treatment steps are commonly practised in chemical refining/neutralisation of oils (see, for example, "Alkali refining of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 7. Caustic Refining). The solubilised base content may be introduced before step (a) or step (e) In one embodiment, the triacylglyceride oil is admixed with water containing a bicarbonate salt or a hydroxide salt, such as sodium bicarbonate or sodium hydroxide.

In another embodiment, the triacylglyceride oil is pre-treated before step (a) or (e) with a combination of both acidic and basic water treatment (e.g. as the previously described acidic and basic water treatments).

In one embodiment, the acid content of the triacylglyceride oil is adjusted preferably under high-shear mixing.

In one embodiment, the base content of the triacylglyceride oil is adjusted preferably under high-shear mixing.

In one embodiment, the acid and base content of the triacylglyceride oil is adjusted preferably under high-shear mixing.

In one embodiment, the method further comprises one or more of the following steps subsequent to step (d) or to step (i):
(j) one or more processes selected from the group consisting of physical or chemical refining, degumming, neutralization and bleaching;
(k) optionally deodorizing the product of step (j), preferably wherein the deodorizing is vacuum steam deodorizing; and
(l) optionally fractionating the product of step (j) and (k).

In another aspect, there is provided a purified triacylglyceride oil obtainable by the method of the invention.

In one embodiment, as a result of purification, the chlorine or chloride carrying substances in the 600-800 m/z range are reduced by at least a factor of 2 in the purified triacylglyceride oil compared to the starting non-purified triacylglyceride oil, preferably as demonstrated by their LC-MS signals.

In one embodiment the quantity of the monochloropandiol esters (MCPDEs) in the heat treated purified oil is reduced by a factor of two compared to the heat treated non-purified oil as measured by direct LC-MS.

In one embodiment the quantity of the monochloropanediol esters (MCPDEs) in the heat treated purified, sediment-free upper phase oil is lower by at least 30% compared to the heat treated sediment containing lower phase oil as measured by direct LC-MS.

In one embodiment the quantity of the monochloropanediol esters (MCPDEs) in the heat treated purified, sediment-free upper phase oil is lower by at least a factor of two, preferably factor five compared to the heat treated sediment containing lower phase oil as measured by direct LC-MS.

In one embodiment the quantity of the monochloropanediols (MCPDs) in the heat treated purified oil is reduced by a factor of two compared to the heat treated non-purified oil as measured by direct LC-MS.

In one embodiment the quantity of the monochloropanediols (MCPDs) in the heat treated purified, sediment-free upper phase oil is lower by at least 30% compared to the heat treated sediment containing lower phase oil as measured by direct LC-MS.

In one embodiment the quantity of the monochloropanediols (MCPDs) in the heat treated purified, sediment-free upper phase oil is lower by at least a factor of two, preferably factor five compared to the heat treated sediment containing lower phase oil as measured by direct LC-MS.

There is also provided a purified triacylglyceride oil according to the invention, for use in the production of a food product.

There is also provided a food product, produced by using a purified triacylglyceride oil according to the invention.

DETAILED DESCRIPTION OF THE INVENTION

Figure 1:
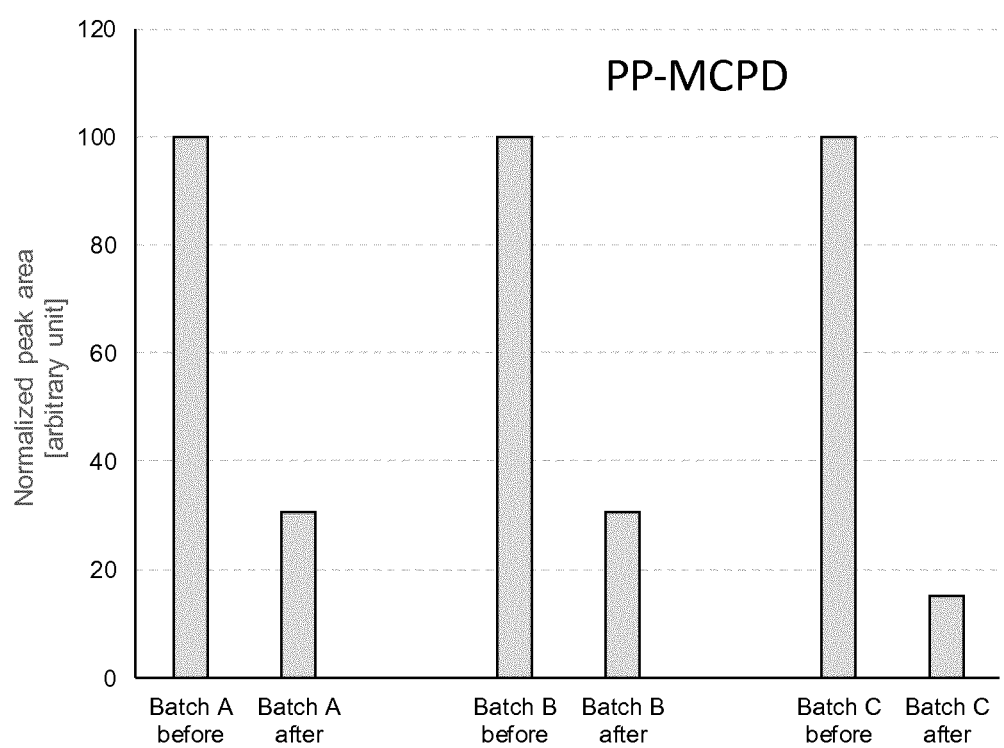
FIGS. 1 to 4—the beneficial effect of the centrifugation based mitigation is shown in FIG. 1 (dipalmitoyl-MCPD, PP-MCPD), FIG. 2 (palmitoyl-oleyl-MCPD), FIG. 3 (dioleyl-MCPD) and FIG. 4 (oleyl-linoleyl-MCPD).

The terms "comprising", "comprises" and "comprised of" as used herein are synonymous with "including" or "includes"; are inclusive or open-ended and do not exclude additional, non-recited members, elements or steps. The terms "comprising", "comprises" and "comprised of" also include the terms "consisting of", "containing" or "contains".

Purification

The purification is particularly suitable for removing insoluble fraction of oils that may contain chlorine/chloride carrying contaminants (substances that may serve as the chlorine source needed for formation of monochloropanediols (MCPDs) or monochloropanediol esters (MCPDEs)) from a starting triacylglyceride oil (i.e. a triacylglyceride oil immediately before it is subjected to step (a) of the method of the invention).

The method of the invention subjects the starting triacylglyceride oils to treatment that physically removes the insoluble fraction of oils containing chloride/chlorine carrying substances, which may be an active source of chlorine during oil refining, from the starting (e.g. crude) oils. The treatment may be based on centrifugation or settling in order to allow centrifugational or gravitational force to concentrate the microparticles, segregated droplets and sediments in a narrow space of the storage vessel and subsequently allow the taking off of the upper phase pure oil.

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). However, it has also been discovered that refined edible oils may contain 3-MCPD in its fatty acid ester form, while only containing very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It is well known that dehalogenation reactions can occur during thermal processes. For example, chlorine has been shown to leave chemical components as hydrogen chloride (gas) upon the input of sufficient activation energy, which is abundant during the deodorization of vegetable oils at high temperatures (e.g. up to 270° C.). The inventors believe that hydrogen chloride may be evolved during oil refining from chlorine-containing compounds inherently present in the starting materials of the triacylglyceride oil refining process, for example plant materials.

Indeed, it has been suggested that MCPD generation reactions increase exponentially (>150° C.) and go to completion in a short time period.

Without wishing to be bound by theory, it is suggested that mechanistically, the MCPD di-esters may be formed during oil refinement via the protonation of the terminal ester group of triacylglycerides (TAG), which represent about 88-95% of total glycerides in most vegetable oils, through interaction with hydrogen chloride evolved during oil refining. The formed oxonium cation can then undergo intramolecular rearrangement, followed by nucleophilic substitution of chloride ion and the release of a free fatty acid and an MCPD di-ester.

Once removed through use of the method of the invention, the potential chlorine source is no longer available for the formation of chlorinated compounds, such as MCPD esters during the heating steps in oil refinement. Purified product oils are thereby obtained that will develop reduced quantity of monochloropropanediols (MCPDs) or monochloropropandiol esters (MCPDEs) when compared to the non-purified refined triacylglyceride oil when they are subjected to various refining practices with heat treatment e.g. deodorization.

In another embodiment, the quantity monochloropropandiol esters (MCPDEs) is reduced in the purified and heat treated triacylglyceride oil by at least 40%, 50%, 60%, 70%, 80%, 90%, 95% or 99% compared to the starting triacylglyceride oil.

Refined oils produced using the method of the invention may contain, for example, less than 3 ppm, less than 1 ppm, less than 0.5 ppm, or preferably less than 0.3 ppm MCPDEs.

In another embodiment, the quantity monochloropropanediols (MCPDs) is reduced in the purified and heat treated triacylglyceride oil by at least 40%, 50%, 60%, 70%, 80%, 90%, 95% or 99% compared to the starting triacylglyceride oil.

Refined oils produced using the method of the invention may contain, for example, less than 3 ppm, less than 1 ppm, less than 0.5 ppm, or preferably less than 0.3 ppm MCPDs.

Quantities of MCPDEs may be readily analysed using protocols well known in the art. For example, liquid chromatography/mass spectrometry (LC/MS)-based approaches are suitable for analysing levels of MCPDEs, as shown in the present Examples.

In one embodiment, the triacylglyceride oil input into step (a) or step (e) of the method of the invention is crude triacylglyceride oil.

The term "crude oil" as used herein may refer to an unrefined oil. For example, in some embodiments, the triacylglyceride oil input into step (a) or step (e) of the method of the invention has not been refined, degummed, bleached and/or fractionated. In a preferred embodiment, the triacylglyceride oil has not been deodorized before step (a) or step (e).

In some embodiments, the triacylglyceride oil is subjected to preliminary processing before step (a) or step (e), such as preliminary cleaning. However, any processes carried out on the triacylglyceride oil before step (a) or step (e) preferably do not involve heating the triacylglyceride oil to a temperature greater than 100° C., 150° C., 200° C. or 250° C. In some embodiments, the triacylglyceride oil is subjected to preliminary refining, fractionation, hydrogenation and/or interesterification before step (a) or step (e).

Triacylglyceride Oil

The term "triacylglyceride" can be used synonymously with "triacylglycerol" and "triglyceride". In these compounds, the three hydroxyl groups of glycerol are each esterified by a fatty acid. Oils that may be purified using the method of the invention comprise triacylglycerides and include plant oil, animal oil, fish oil, algal oil and combinations thereof.

In a preferred embodiment, the triacylglyceride oil is a plant oil. Example, plant oils include sunflower oil, corn oil, canola oil, soybean oil, coconut oil, palm oil, palm kernel oil and cocoa butter.

In another embodiment, the triacylglyceride oil is palm oil or fractionated palm oil such as palm olein, palm stearin, mid-fraction.

In a preferred embodiment, the triacylglyceride oil is a crude plant oil.

In another preferred embodiment, the triacylglyceride oil is crude palm oil or fractionated crude palm oil such crude palm olein, crude palm stearin, crude mid-fraction.

In one embodiment, the plant oil is crude palm oil. In one embodiment, the plant oil is crude corn oil. In one embodiment, the plant oil is crude sunflower oil. In one embodiment, the plant oil is cold pressed crude canola oil. In one embodiment, the plant oil is crude soybean oil.

In a preferred embodiment, the plant oil is at least partially solvent extracted. Preferably, the solvent is a mixture of 2-propanol and n-hexane.

In one embodiment, the plant oil is solvent extracted crude sunflower seed oil.

In one embodiment, the plant oil is solvent extracted crude canola seed oil.

Crude Triacylglyceride Oil

In the case of palm oil, crude oil may be produced from different portions of palm fruit, e.g. from the flesh of the fruit known as mesocarp and also from seed or kernel of the fruit. The extraction of crude palm oil (CPO) from the crushed fruits can be carried out under temperatures ranging for example from 90 to 140° C.

In other cases, for example sunflower, crude oil may be produced by pressing, by solvent extraction or the combination thereof, for example as described by Gotor & Rhazi in Oilseeds & fats Crops and lipids 2016 (DOI: 10.1051/ocl/2016007).

Refined Oils

As used herein, the term "refined" may refer to oils that have been subjected to methods that improve the quality of the oil and include a heat treatment. This heat treatment may be a deodorization step comprising steam distillation or short path distillation. Such heat treatment can be applied in the 150-300° C. range, more commonly in the 160-260° C. or the 160-240° C. range.

Heat Treatment

As used herein, the term "heat treatment" may refer to exposing the oil to temperatures in the 150-300° C. range, more commonly in the 160-260° C. or the 160-240° C. range. The heat treatment may be applied in closed vessels or in ampoules or in combination with vacuum and/or steam as it is done in the industrial setting during deodorization (steam distillation or short path distillation).

Chlorine and Chloride

Chlorine is a chemical element with symbol CI and atomic number 17. Chlorine can be found in a wide range of substances both in ionic (e.g. sodium chloride) and covalent form (e.g. polyvinyl chloride). Accordingly, the terms "chlorine" and "chloride" both refer to substances that contain the chlorine element in various forms.

As used herein, the terms "chlorine containing", "chloride containing", "organochlorine", "chlorine donor", all refer to substances that in any format contain the chlorine element. This format can be either ionic, polar covalent or covalent.

Chlorine or Chloride Carrying Substances

As used herein, the terms "chlorine or chloride carrying substances" refer to substances that in any format contain the chlorine element. This format can be either ionic, polar covalent or covalent.

Chlorine Donor

As used herein, the terms "chlorine donor" refer to substances that in any format contain the chlorine element and may release the chlorine in any form for example but not restricted to hydrochloric acid, hypochlorite, chloride anion.

Acidity and pH

In chemistry, pH is a scale used to specify how acidic or how basic is a water-based solution. Similarly, as used herein, the term "pH" and the term "acidity" refer to the free acid content of the oil samples. For example when mixing the oil with phosphoric acid can be considered as lowering its pH. Similarly, a neutralization step with the addition of sodium hydroxide to the oil can be considered as increasing the pH of the oil.

Melting Temperature

The term "melting temperature" as used herein may refer to the temperature at which a solid changes state from solid to liquid at a pressure of 100 kPa. For example, the melting temperature may be the temperature at which a solid changes state from solid to liquid at a pressure of 100 kPa when heated at 2° C. per minute.

The skilled person is readily able to select suitable methods for the determination of the melting temperature of the triacylglyceride oil.

For example, apparatus for the analysis of melting temperatures may consist of a heating block or an oil bath with a transparent window (e.g. a Thiele tube) and a magnifier. A sample of the solid may be placed in a thin glass tube and placed in the heating block or immersed in the oil bath, which is then gradually heated. The melting of the solid can be observed and the associated melting temperature noted.

For fats and oils with highly complex triacylglycerol composition, the method of Slip Melting Point is a commonly used reference (AOCS Official method Cc 3-25).

Centrifugation

The term "centrifugation" as used herein may refer to the rapid rotation of a vessel including its oil content in order to exert centrifugal force on the vessel and its content.

In one embodiment, the centrifugation occurs at elevated temperatures at which the oil is in the liquid state. This temperature can be 30° C., 40° C., 50° C., 60° C., 70° C., 80° C., 100° C. or above for palm oil and 50° C., 60° C., 80° C., 100° C. or above for palm stearin, 15° C., 20° C. or above for palm olein, 5° C. or above for seed oils including sunflower oil, canola/rapeseed oil, corn oil.

In a preferred embodiment, the temperature can be between 30° C. and 80° C. for palm oil, preferably between 35° C. and 70° C. In a preferred embodiment, the temperature can be between 5° C. and 20° C. for sunflower oil. In a preferred embodiment, the centrifugation speed is at least 15,000 g for 15 min.

Settling

The term "settle" or "settling" as used herein may refer to setting the oil vessel into a movement free or substantially movement free environment, preferably avoiding its disturbance for a period of time that can be at least 4 hours, 6 hours, 1 day, 2 days, a week or a month.

In one embodiment, the oil vessel is settled into a fixed, movement free environment and its disturbance avoided for a period of time of at least 5 months, for example for crude sunflower oil or crude soybean oil. In one embodiment, the crude oil is heated to at least 60° C. prior to settling.

In one embodiment, the oil vessel is settled into a fixed, movement free environment and its disturbance avoided for a period of time of at least 4 days, for example for cold pressed crude canola oil.

Further Refinement

As the insoluble oil components along with their chlorine donor substances are depleted by the method of the invention, heating during any subsequent refinement processes will not cause significant generation of unwanted chlorinated compounds, such as the MCPDEs.

In one embodiment, the method further comprises one or more processes selected from the group consisting of physical or chemical refining, degumming, neutralization and bleaching subsequent to step (d) or step (i).

In one embodiment, the method further comprises deodorization subsequent to step (d) or step (i), preferably wherein the deodorization is vacuum steam deodorization.

In one embodiment, the method further comprises fractionation subsequent to step (d) or step (i).

Processes for carrying out refinement, degumming, bleaching, deodorization and fractionation are well known in the art.

By way of example, refinement of plant oil, such as vegetable oil, typically consists of physical refining or chemical refining.

In efforts aimed at increased sustainability, oil refineries have modified their plant oil processing lines in the past few decades for the minimisation of energy expenditure (economisers) and the reduction of waste. However, the steps of these two refining processes have essentially remained the same.

Physical refining is essentially an abridged form of chemical refining and was introduced as the preferred method of palm oil refining in 1973. It may be a three step continuous operation where the incoming oil is pre-treated with acid (degumming), cleansed by being passed through adsorptive bleaching clay, and then subjected to steam distillation. This process allows for the subsequent deacidification, deodorization and decomposition of carotenoids unique to palm oil (i.e. the crude oil is deep red in colour, unlike other vegetable oils). Given the lack of neutralisation step in physical refining, refined bleached (RB) oil produced from a physical refinery contains nearly the same free fatty acid (FFA) levels as found in the crude oil.

Neutralised bleached (NB) oil from a chemical refinery and RB palm oil are comparable pre-deodorization in every other aspect.

The heat bleaching unit operation is the main source of loss in the oil refining process resulting in 20-40% reduction in oil volume post filtration. The process typically lasts for about 30-45 min and typically takes place under 27-33 mbar vacuum at a temperature of 95-110° C.

Heat bleached oil may then be rerouted in piping to a deaerator that aides in the removal of dissolved gases, as well as moisture, before being sent to a deodorization tower.

A bleaching step may comprise heating the oil and cleaning the oil by passing it through adsorptive bleaching clay.

A deodorization step may comprise steam distillation.

The skilled person will understand that they can combine all features of the invention disclosed herein without departing from the scope of the invention as disclosed.

Preferred features and embodiments of the invention will now be described by way of non-limiting examples.

The practice of the present invention will employ, unless otherwise indicated, conventional techniques of chemistry, biochemistry, molecular biology, microbiology and immunology, which are within the capabilities of a person of ordinary skill in the art. Such techniques are explained in the literature. See, for example, Sambrook, J., Fritsch, E. F. and Maniatis, T. (1989) Molecular Cloning: A Laboratory Manual, 2nd Edition, Cold Spring Harbor Laboratory Press; Ausubel, F. M. et al. (1995 and periodic supplements) Current Protocols in Molecular Biology, Ch. 9, 13 and 16, John Wiley & Sons; Roe, B., Crabtree, J. and Kahn, A. (1996) DNA Isolation and Sequencing: Essential Techniques, John Wiley & Sons; Polak, J. M. and McGee, J. O'D. (1990) In Situ Hybridization: Principles and Practice, Oxford University Press; Gait, M. J. (1984) Oligonucleotide Synthesis: A Practical Approach, IRL Press; and Lilley, D. M. and Dahlberg, J. E. (1992) Methods in Enzymology: DNA Structures Part A: Synthesis and Physical Analysis of DNA, Academic Press. Each of these general texts is herein incorporated by reference.

EXAMPLES

Analytical Procedures Used in the Examples

Sample Preparation

Oil samples were diluted stepwise prior to injection.
1) Firstly, 100 μL of each sample was transferred into a vial and 900 μL of a mixture of n-Hexane:Acetone (1:1 v/v) was added. The sample was vortexed for 5-10 s.
2) In the second step, 50 μL of this solution was further diluted by mixing it with 950 μL of acetone. The obtained solution was vortexed for 5-10 s.
3) 100 μL of this latter solution was mixed with 90 μL of methanol and 10 μL of internal standard mix solution. (the internal standard mix solution contained at 2 ng/μL concentration the following stable isotope labeled compounds solubilized in methanol: 1-oleoyl 2-linoleoyl 3-chloropropanediol-$^2H_5$ (OL), 1-2-dipalmitoyl 3-chloropropanediol-$^2H_5$ (PP), 1-palmitoyl 2-oleoyl 3-chloropropanediol-$^2H_5$ (PO), 1-palmitoyl 2-linoleoyl 3-chloropropanediol-$^2H_5$ (PL), 1-2-dilinolenoyl 3-chloropropanediol-$^2H_5$, (LL)), 1-2-oleoyl 3-chloropropanediol-$^2H_5$, (OO)).

LC Conditions

Ultra high performance liquid chromatography was performed using either a Thermo UltiMate 3000 system or a Waters Acquity H-class system equipped with a silica based octadecyl phase (Waters Acquity HSS C18, 1.7 μm; 2.1×150 mm). The applied solvent gradient is summarised in Table 3.

TABLE 3

Details of the applied LC gradient (solvent A was 1 mM ammonium-formate in methanol; and solvent B was 100 μM ammonium-formate in isopropanol).

| Time [min] | Solvent A [%] | Solvent B [%] | Flow rate [μL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters was performed using Thermo Fisher high resolution mass spectrometers (Q Exactive Hybrid Quadrupole-Orbitrap, Orbitrap Fusion™ Lumos™ Tribrid™ and Orbitrap Elite Hybrid). These platforms enabled highly selective mass analysis at a routine mass accuracy of ~2 ppm. MCPD esters were monitored in ESI positive ion mode (ESI$^+$). Under these conditions the observed MCPD precursor ion was [M-H]$^-$, whereas the monitored MCPD ester ions were the [M+NH$_4$]$^+$ and [M+Na]$^+$ adducts.

Data Interpretation

The relative quantification of MCPDE was performed by first extracting the ion chromatograms of the [M+NH$_4$]$^+$ and [M+Na]$^+$ adducts at their respective m/z value in a 10 ppm mass window and then integrating the resulting peak areas at the corresponding chromatographic retention time. The abbreviations of the monitored MPCDEs are as following: PP: dipalmitoyl MCPD ester; PO: palmitoyl-oleyl MCPD ester; OO: dioleyl MCPD ester; OL: oleyl-linoleyl MPCD ester; LL: dilinoleyl MCPD ester; PL: palmitoyl-linoleyl MPCD ester.

For every experiment, the peak areas of the most abundant MPCDEs detected in the control samples were set as 100% and the results found in the mitigated samples were expressed as a relative % compared to the non-mitigated control samples.

In-Ampoulle Heat Treatment of the Samples

The heat treatment of crude oil samples was performed in sealed glass ampoules under nitrogen for 2 h at 230° C. in a Thermo Scientific Heraeus oven (series 6100). The glass ampoules were fabricated from glass Pasteur pipettes by flushing them with nitrogen and sealing them using a Bunsen gas burner. These conditions were chosen in order to mimic the thermal conditions used during edible-oil deodorization.

Example 1

Solvent Extracted Crude Palm Oil
Production of Solvent Extracted Crude Palm Oil 1.8 kg frozen, whole, intact palm fruit was thawed at room temperature. The kernels were removed from the fruit manually using a scalpel. 4 L of extraction solution was prepared by mixing 2 L of 2-propanol and 2 L of n-hexane. 1.4 kg of palm pulp including the fruit flesh and skin was mixed, pureed and homogenised with 2 L of extraction solution using a commercial immersion blender mixer (Bamix Gastro 200). The resulting slurry was mixed and further homogenised with the remaining 2 L of extraction solution using a polytron (Kinematica Polytron PT 10 35 GT). The resulting slurry solution was aliquoted into 1 L polypropylene tubes (Sorvall 1000 mL) and centrifuged at 4000 g for 15 min at 30° C. in a Thermo Scientific Heraeus Cryofuge 8500i centrifuge. The organic phases were filtered through filter paper (Whatman 595½) and were combined. The organic solvent was then evaporated from the oil using a Bûchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Different batches of crude palm oils were subjected to centrifugation, in order prevent the formation of MPCDEs during heat treatment.
Centrifugation of Solvent Extracted Crude Palm Oil 1 L of crude palm oil prepared as described above was melted by heating to 80° C. in a water bath. The oil was homogenized by manual shaking. 40 mL aliquots were transferred into 50 mL Falcon test tubes. The tubes were inserted into an Eppendorf 5810 centrifuge pre-heated to 40° C. and were centrifuged at 15000 g for 15 min at 40° C.

Figure 2:
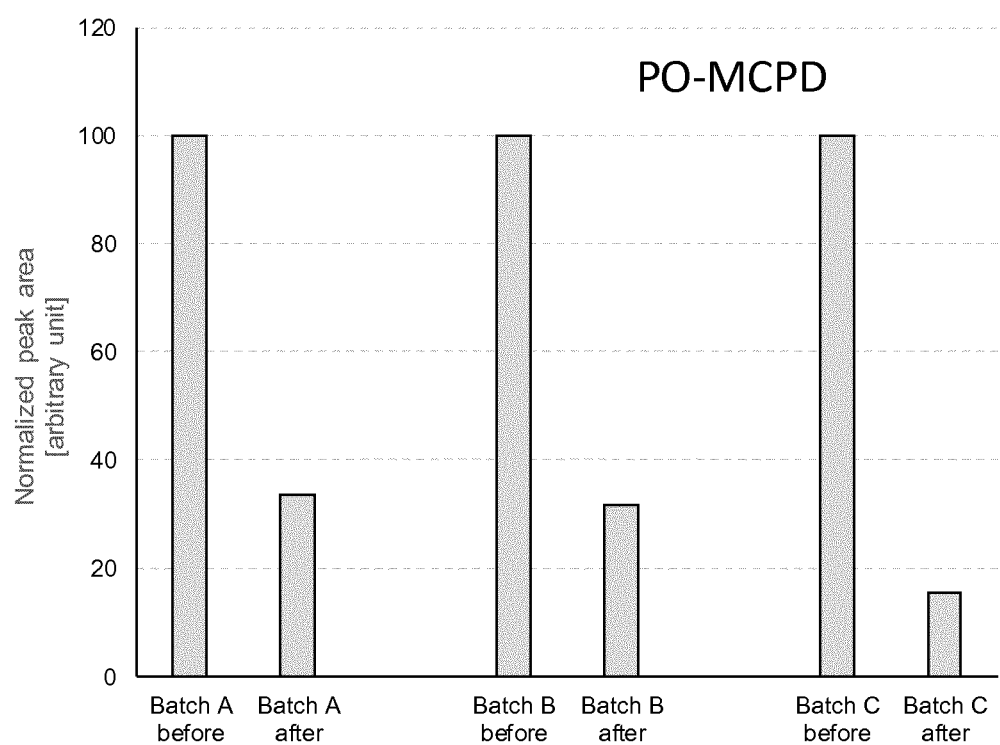
Figure 3:
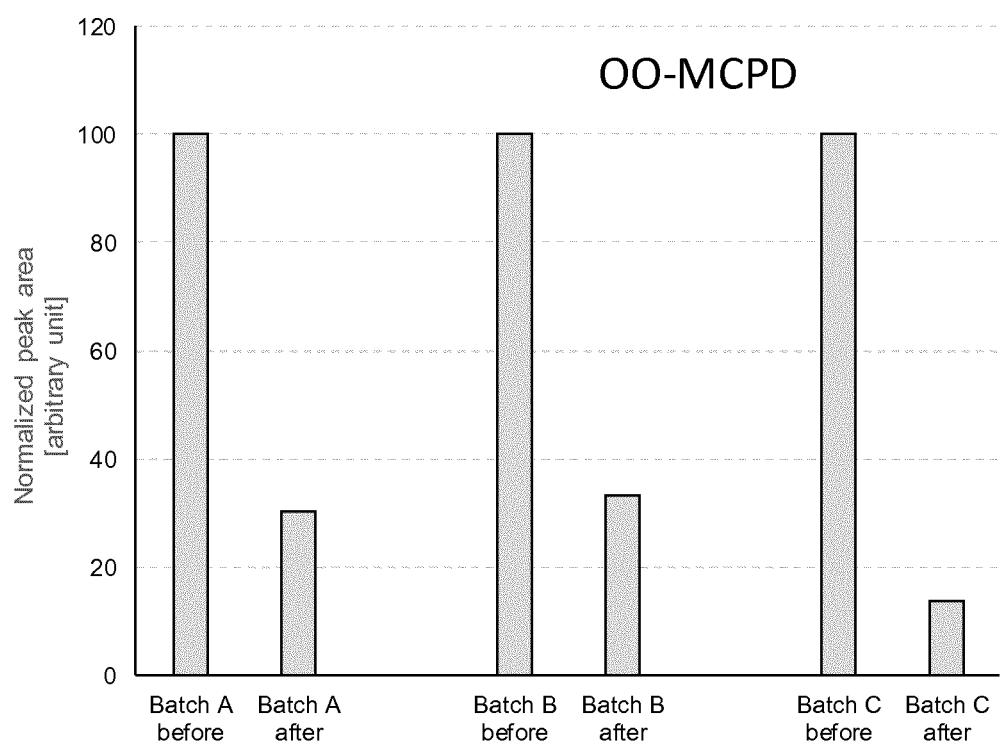
Figure 4:
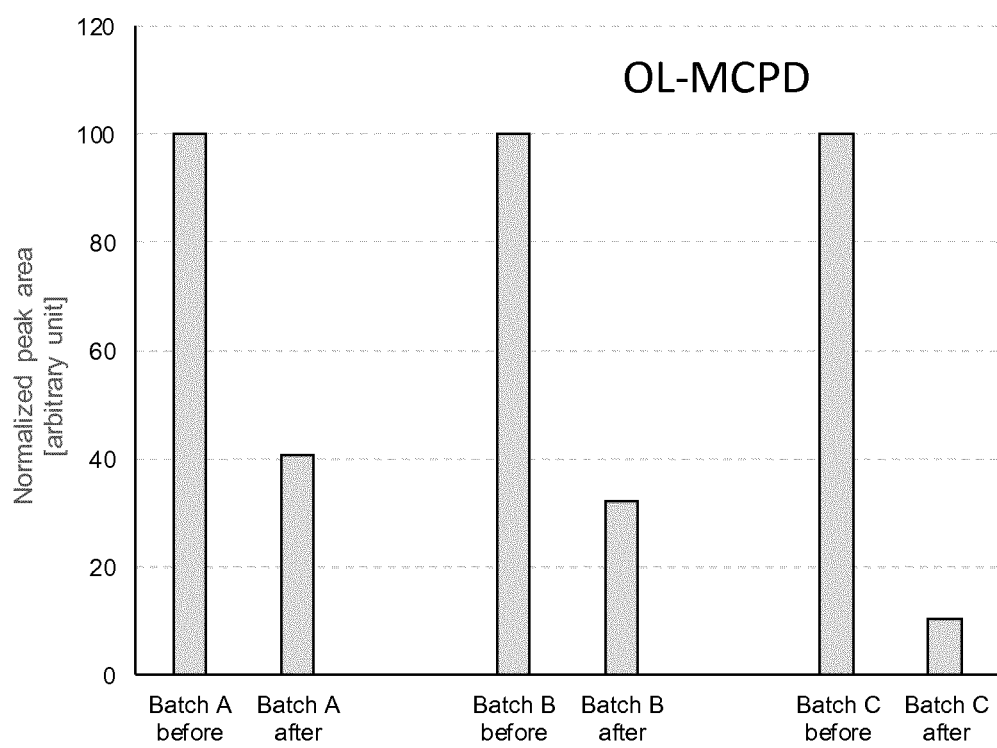

Following the treatment via centrifugation, the resulting oil and the starting material (without centrifugation) have been subjected to heat treatment as described above in order to mimic the thermal conditions used during edible-oil deodorization. The resulting samples have been analysed for their MPCDE content by LC-MS. The beneficial effect of the centrifugation based mitigation is shown in FIG. 1 (dipalmitoyl-MCPD, PP-MCPD), FIG. 2 (palmitoyl-oleyl-MCPD, PO-MCPD), FIG. 3 (dioleyl-MCPD, 00-MCPD) and FIG. 4 (oleyl-linoleyl-MCPD, OL-MCPD).

Example 2

Solvent Extracted Crude Sunflower Oil
Production of Solvent Extracted Crude Sunflower Seed Oil 1.2 kg of sunflower seeds were crushed and homogenised with 1.5 L of extraction solution (2-propanol:n-hexane, 1:1 v/v) using a commercial immersion blender mixer (Bamix Gastro 200). The homogenate was mixed with a further 1.5 L of extraction solution and further homogenised using a polytron (Kinematica Polytron PT 10 35 GT). The resulting slurry was aliquoted into 1 L polypropylene tubes (Sorvall 1000 mL) and centrifuged at 4000 g for 15 min at 22° C. in a Thermo Scientific Heraeus Cryofuge 8500i centrifuge. The organic phases were filtered through filter paper (Whatman 595 ½) and were combined. The organic solvent was then evaporated from the oil using a Bûchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Crude solvent extracted sunflower oil (produced as described above) was subjected to centrifugation in order to prevent the formation of MCPDEs during heat treatment.
Centrifugation of Solvent Extracted Crude Sunflower Oil 1 L of crude sunflower oil prepared as described above was homogenized by manual shaking. 40 mL aliquots were transferred into 50 mL Falcon test tubes. The tubes were inserted into an Eppendorf 5810 centrifuge and were centrifuged at 15000 g for 15 min at 23° C.

Figure 5:
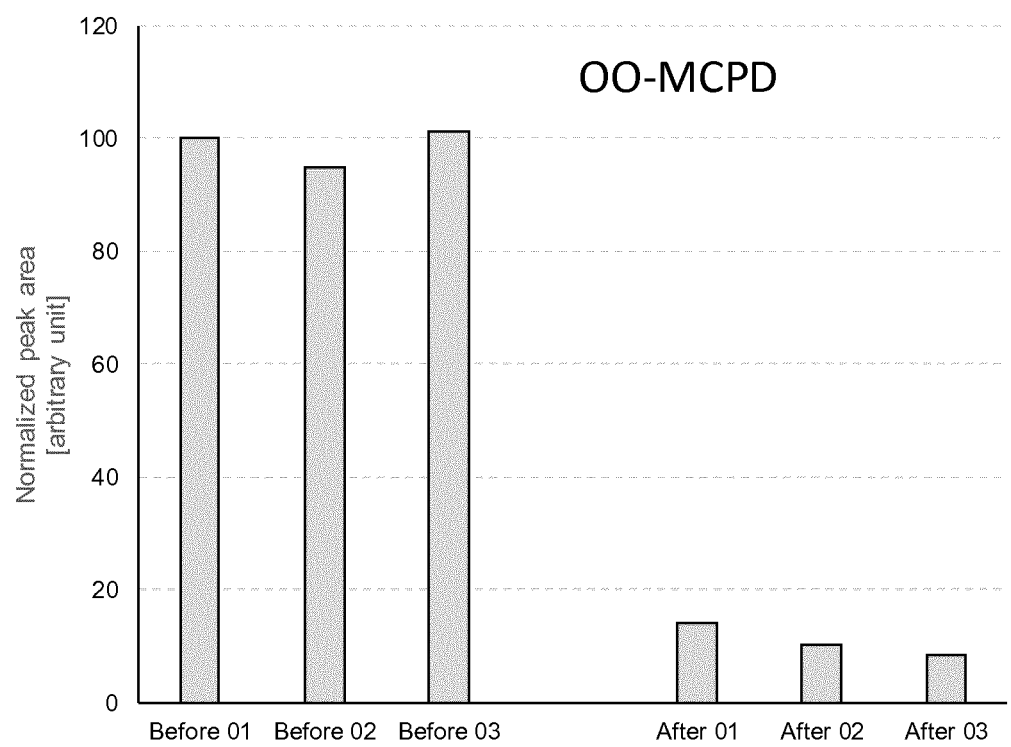
FIGS. 5 to 7—the beneficial effect of the centrifugation based mitigation is shown in FIG. 5 (dioleyl-MCPD), FIG. 6 (oleyl-linoleyl-MCPD) and FIG. 7 (dilinoleyl-MCPD).
Figure 6:
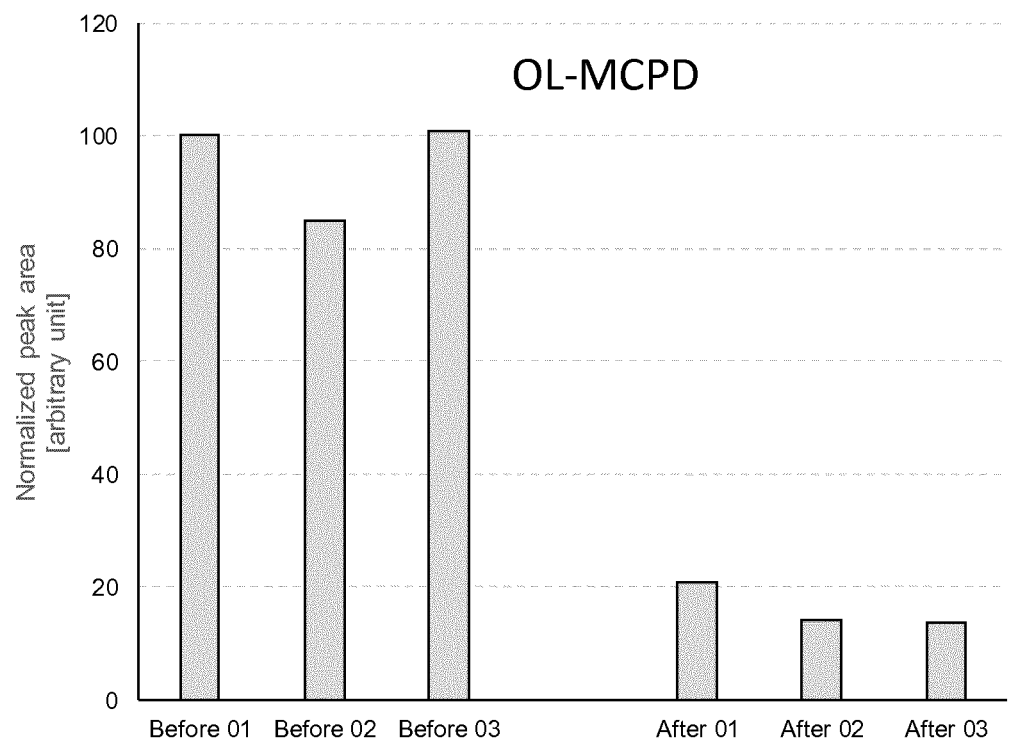
Figure 7:
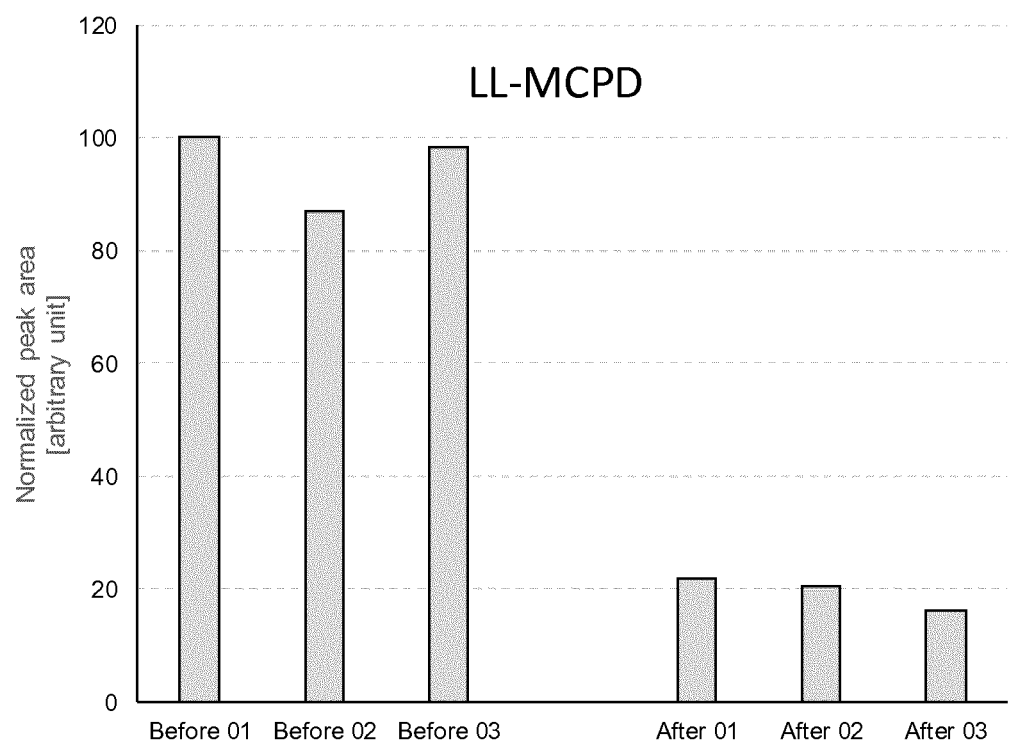

Following the treatment via centrifugation, the resulting oil and the starting material (without centrifugation) have been subjected to heat treatment in triplicates as described above in order to mimic the thermal conditions used during edible-oil deodorization. The resulting samples have been analysed for their MPCDE content by LC-MS. The beneficial effect of the centrifugation based mitigation is shown in FIG. 5 (dioleyl-MCPD, 00-MCPD), FIG. 6 (oleyl-linoleyl-MCPD, OL-MCPD) and FIG. 7 (dilinoleyl-MCPD, LL-MCPD).

Overall, the data show substantial reduction in the levels of monochloropropandiol esters (MCPDEs) after the mitigation compared to the levels observed in the absence of treatment for each of the studies on crude sunflower oil and crude palm oil.

Example 3

Industrially Produced Crude Palm Oil

Industrially produced crude palm oil was purchased from Nutriswiss (Lyss, Switzerland). The oil was subjected to mitigation trials by centrifugation.

1 L of crude palm oil was melted by heating to 80° C. in a water bath. The oil was homogenized by manual shaking. 40 mL aliquots were transferred into 50 mL Falcon test tubes. The tubes were inserted into an Eppendorf 5810 centrifuge pre-heated to 40° C. and were centrifuged at 15000 g for 15 min at 40° C.

Figure 8:
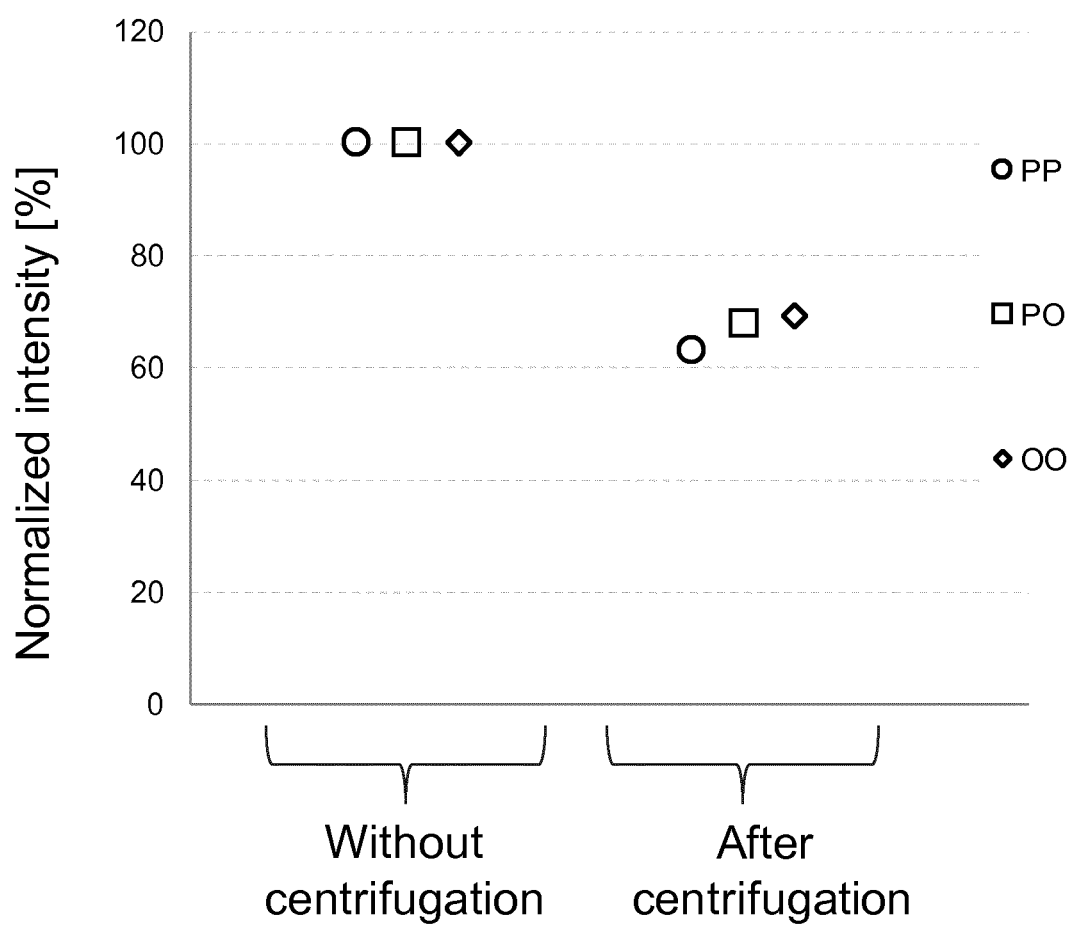
FIG. 8—the beneficial effect of centrifugation is shown on the observed MCPDE levels in heated "industrially produced crude palm oil".

The resulting samples were subjected to heat treatment in ampoules in order to simulate the formation of MCPDEs and were analysed by LC-MS for their MCPDE content accordingly. The benefits of the centrifugation on the resulting MCPDE levels are shown in FIG. 8.

Example 4

Long-Term Settling of Industrially Produced Crude Corn Oil

Industrially produced crude corn oil was purchased from VFI GmbH (Wets, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

Figure 9:
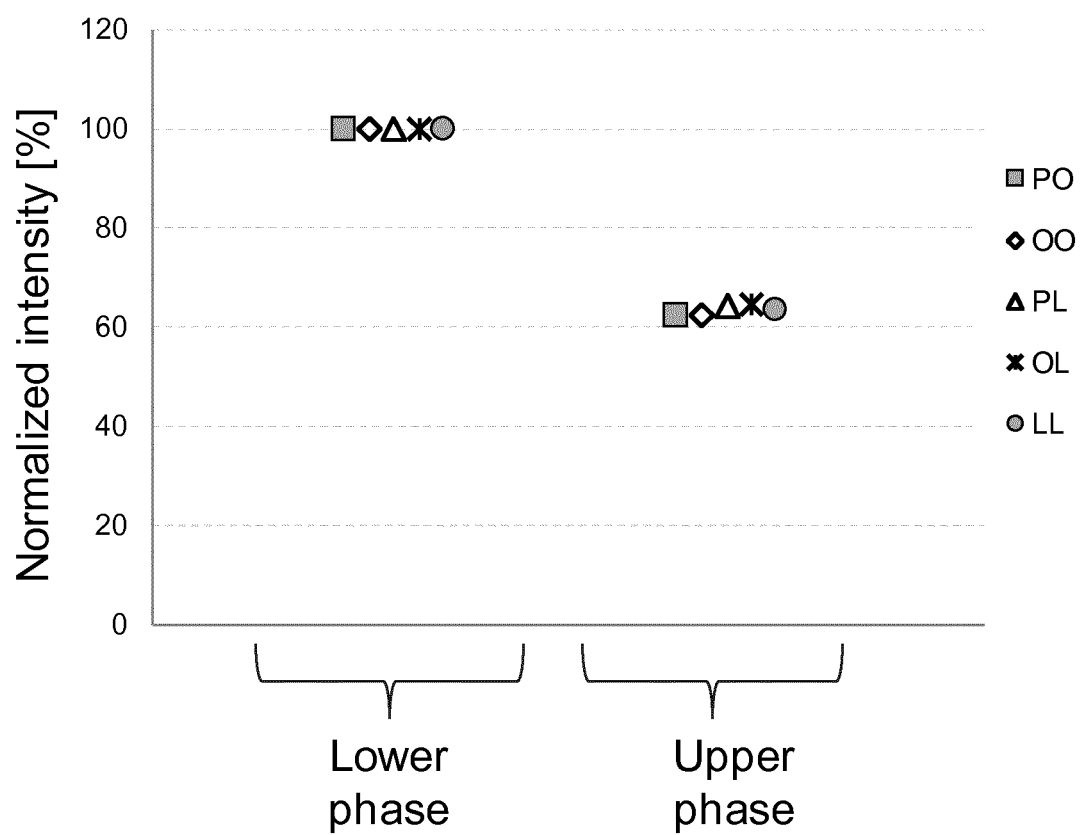
FIG. 9—MCPDEs observed in the heated lower and upper phase of the "industrially produced crude corn oil" following the long term settling.

The resulting samples were subjected to heat treatment in ampoules in order to simulate the formation of MCPDEs and were analysed by LC-MS for their MCPDE content accordingly. The benefits of the long term settling on the resulting MCPDE levels are shown in FIG. 9.

Example 5

Long-Term Settling of Industrially Produced Crude Sunflower Oil

Industrially produced crude bio sunflower oil was purchased from VFI GmbH (Wets, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

The resulting samples were subjected to heat treatment in ampoules in order to simulate the formation of MCPDEs and were analysed by LC-MS for their MCPDE content accordingly.

Figure 10:
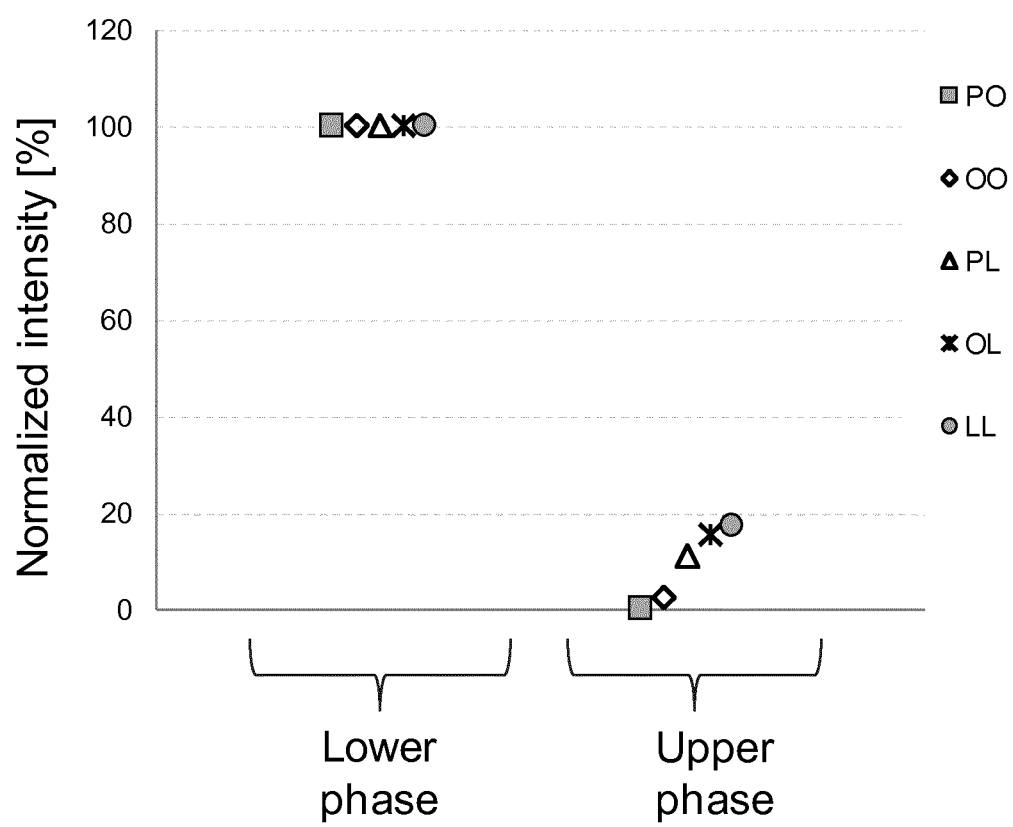
FIG. 10—MCPDEs observed in the heated lower and upper phase of the "industrially produced crude sunflower oil" following the long term settling.

The benefits of the long term settling on the resulting MCPDE levels are shown in FIG. 10.

Example 6

Short Term Settling of Cold Pressed Crude Canola Oil 7.9 kg of canola seeds were pressed using a home electrical oil press (OP 700, Rommelsbacher, Germany) resulting in ~2.4 kg of pressed oil and ~5.5 kg of remaining solid residue (cake). The pressed oil was then filtered through filter paper (Whatman 595%) at 65° C. in the oven.

2 L of crude oil was then left on the bench at room temperature without any disturbance for 4 days for settling.

After the 4-days time period, a 20-mL aliquot was taken from both the upper phase and from the bottom phase, called "upper phase" and "lower phase" respectively.

Figure 11:
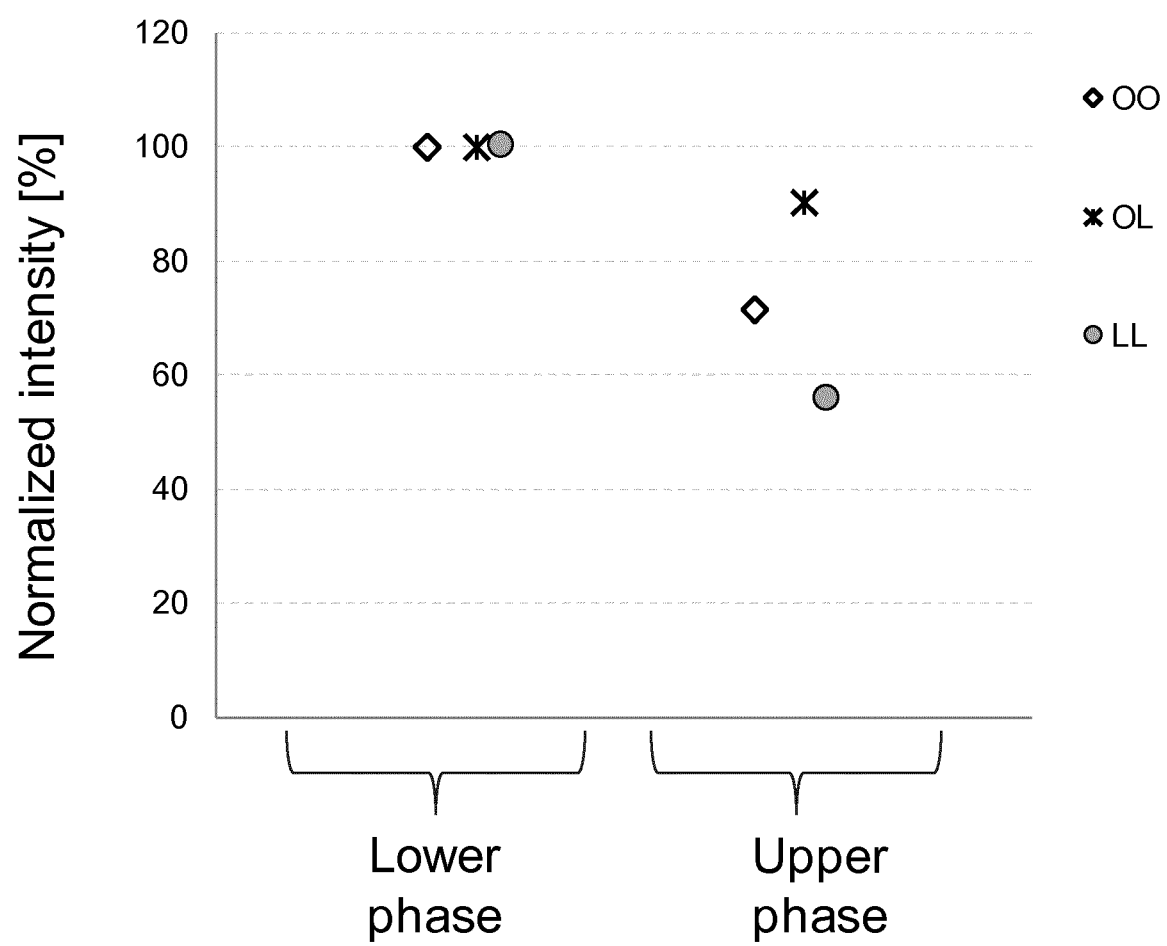
FIG. 11—MCPDEs observed in the heated lower and upper phase of the "cold-pressed crude canola oil" following the short term settling.

The resulting samples were subjected to heat treatment in ampoules in order to simulate the formation of MCPDEs and were analysed by LC-MS for their MCPDE content accordingly. The benefits of the short term settling on the resulting MCPDE levels are shown in FIG. 11.

Example 7

Long-Term Settling of Industrially Produced Crude Soybean Oil

Industrially produced crude bio soybean oil was purchased from VFI GmbH (Wets, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

Figure 12:
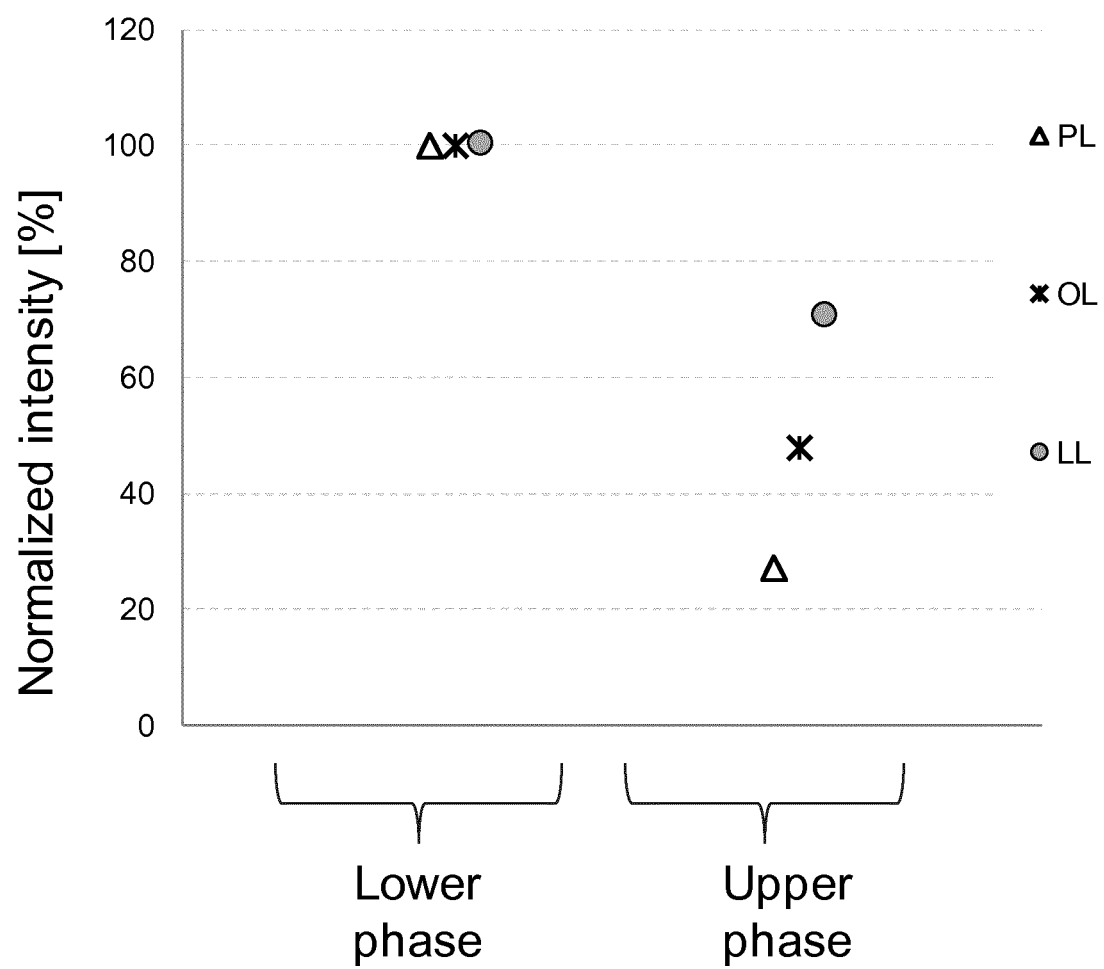
FIG. 12—MCPDEs observed in the heated lower and upper phase of the "industrially produced crude soybean oil" following the long term settling.

The resulting samples were subjected to heat treatment in ampoules in order to simulate the formation of MCPDEs and were analysed by LC-MS for their MCPDE content accordingly. The benefits of the long term settling on the resulting MCPDE levels are shown in FIG. 12.

Example 8

Long-Term Settling of Solvent Extracted Crude Sunflower Oil

Production of solvent extracted crude sunflower seed oil is described above.

1 L of this crude oil was subjected to long term settling trial by leaving it on the bench at room temperature without any disturbance for 5 months.

After the 5-month time period, 40-mL aliquots were taken from the upper phase and from the bottom phase, called "upper phase" and "lower phase" respectively.

Figure 13:
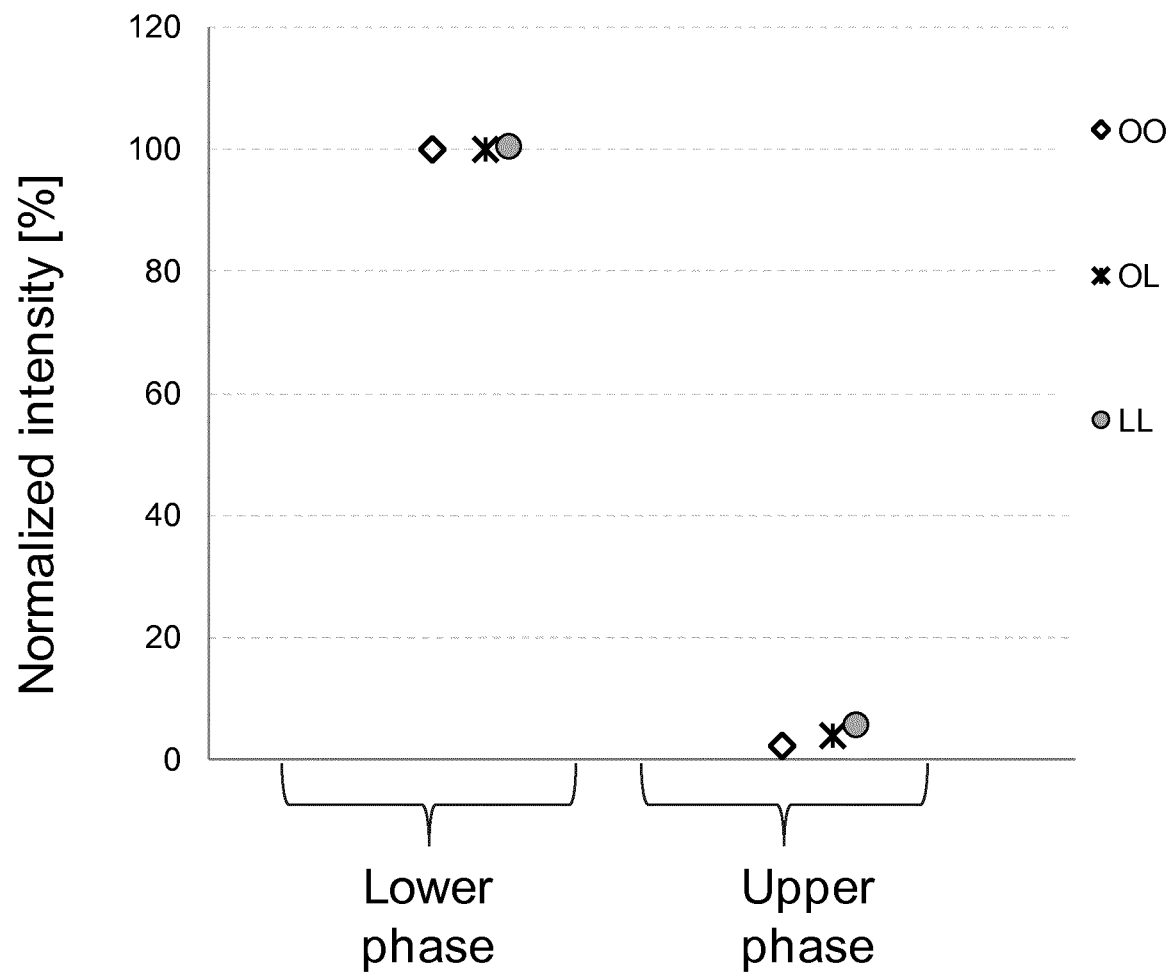
FIG. 13—MCPDEs observed in the heated lower and upper phase of the "solvent extracted crude sunflower oil" following the long term settling.

The resulting samples were subjected to heat treatment in ampoules in order to simulate the formation of MCPDEs and were analysed by LC-MS for their MCPDE content accordingly. The benefits of the long term settling on the resulting MCPDE levels are shown in FIG. 13.

Example 9

Industrially produced crude palm oil was purchased from Nutriswiss (Lyss, Switzerland). The oil was subjected to mitigation trials by centrifugation.

1 L of crude palm oil was melted by heating to 40° C. in a water bath. The oil was homogenized by manual shaking. 30 mL aliquots were transferred into 50 mL Falcon test tubes. The tubes were inserted into an Eppendorf 5810 centrifuge pre-heated to 40° C. and were centrifuged at 15000 g for 15 min at 40° C.

Figure 14:
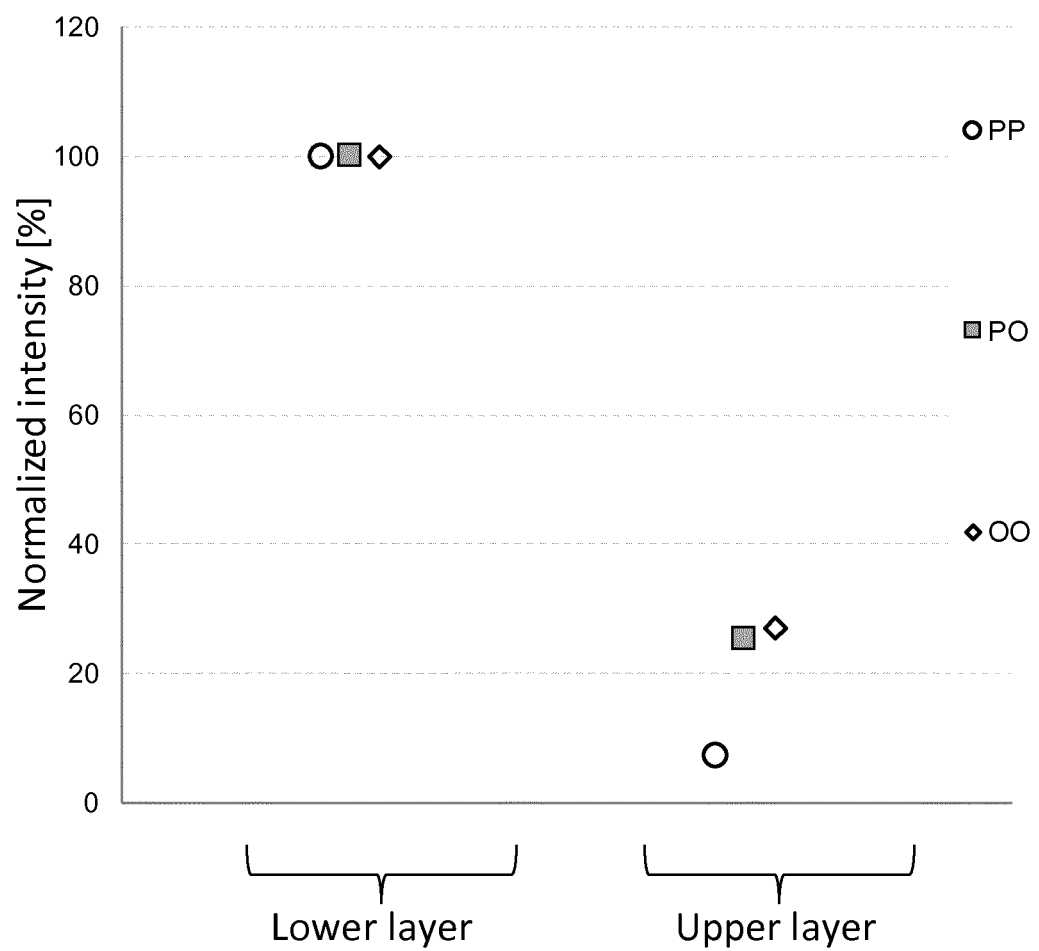
FIG. 14—MCPDEs observed in the heated lower and upper phase of the "industrially produced palm oil" following centrifugation.

The resulting samples were subjected to heat treatment in ampoules in order to simulate the formation of MCPDEs and were analysed by LC-MS for their MCPDE content accordingly. The benefits of the centrifugation on the resulting MCPDE levels are shown in FIG. 14.

All publications mentioned in the above specification are herein incorporated by reference. Various modifications and variations of the disclosed methods, uses and products of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A method for preventing or reducing the formation of monochloropropanediols (MCPDs) or monochloropropanediol esters (MCPDEs) during a heat treatment of a starting triacylglyceride oil into a heat treated triacylglyceride oil, wherein the starting triglyceride oil is a plant oil which is at least partially solvent extracted, the method comprising:
  (a) concentrating insoluble components in the starting triacylglyceride oil to form a purified triacylglyceride oil, by a process selected from the group consisting of:
    (i) applying a centrifugational force on the starting triacylglyceride oil while maintaining the starting triacylglyceride oil above its melting temperature, and then allowing the insoluble components to settle by gravitational force while maintaining the starting triacylglyceride oil above its melting temperature; and
    (ii) allowing the insoluble components to settle by gravitational force while maintaining the starting triacylglyceride oil above its melting temperature, and then applying additional centrifugational force on the starting triacylglyceride oil while maintaining the starting triacylglyceride oil above its melting temperature;
  (b) separating the purified triacylglyceride oil from the insoluble components; and
  (c) applying the heat treatment to the purified triacylglyceride oil to form the heat treated triacylglyceride oil, wherein the formation of the MCPDs or MCPDEs in the heat treated triacylglyceride oil is prevented or reduced as compared to a level that would be formed by the heat treatment of the starting triacylglyceride oil with the insoluble components still present therein.

2. The method of claim 1, wherein the method further comprises, before step (a), melting the starting triacylglyceride oil by heating it to above its melting temperature.

3. The method of claim 1, wherein a quantity of the MCPDs or MCPDEs in the heat treated triacylglyceride oil of step (c) is measured.

4. The method of claim 1, wherein the starting triacylglyceride oil is palm oil or fractions obtained from palm oil.

5. The method of claim 1, wherein the starting triacylglyceride oil is sunflower oil or its high oleic variants.

6. The method of claim 1, wherein the pH of the starting triacylglyceride oil is adjusted before step (a) through washing, degumming, neutralization or combinations thereof.

7. The method of claim 1 further comprising after step (c):
(d) one or more processes selected from the group consisting of physical or chemical refining, degumming, neutralization and bleaching.

8. The purified triacylglyceride oil obtainable by the method of claim 1, wherein the chlorine or chloride carrying substances in the 600-800 m/z range in the purified triacylglyceride oil are reduced by at least a factor of 2 compared to those in the starting triacylglyceride oil.

9. The method of claim 1, wherein the plant oil is selected from the group consisting of palm oil, sunflower oil, corn oil, canola oil, soybean oil, coconut oil, palm kernel oil and cocoa butter.

10. The method of claim 1, wherein the heat treatment is steam distillation or short path distillation.

11. The method of claim 1, wherein the heat treatment occurs in a closed vessel.

12. The method of claim 1, wherein the heat treatment comprises exposing the purified triacylglyceride oil to a temperature range of 150-300° C. for at least 30 minutes.

13. The method of claim 12, wherein the temperature range is 160-290° C.

14. The method of claim 12, wherein the temperature range is 160-240° C.

* * * * *